US010021656B2

(12) United States Patent
Patel et al.

(10) Patent No.: US 10,021,656 B2
(45) Date of Patent: Jul. 10, 2018

(54) ACCESS POINT TRANSMIT STREAM POLARIZATION DIVERSITY

(71) Applicant: Aruba Networks, Inc., Sunnyvale, CA (US)

(72) Inventors: Deven Patel, Sunnyvale, CA (US); Phillip Carranco, Sunnyvale, CA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 35 days.

(21) Appl. No.: 15/223,089

(22) Filed: Jul. 29, 2016

(65) Prior Publication Data

US 2018/0035392 A1    Feb. 1, 2018

(51) Int. Cl.
G06F 11/00    (2006.01)
H04J 3/14    (2006.01)
H04L 1/00    (2006.01)
H04L 12/26    (2006.01)
H04W 52/30    (2009.01)
H04W 72/04    (2009.01)
H04W 28/02    (2009.01)
H04B 17/318    (2015.01)
H04W 88/08    (2009.01)
H04W 88/02    (2009.01)

(52) U.S. Cl.
CPC .......... H04W 52/30 (2013.01); H04B 17/318 (2015.01); H04W 28/0268 (2013.01); H04W 72/048 (2013.01); H04W 88/02 (2013.01); H04W 88/08 (2013.01)

(58) Field of Classification Search
CPC ............. H04W 52/30; H04W 28/0268; H04W 72/048; H04W 88/02; H04W 88/08; H04B 17/318

USPC ........................................ 370/252, 253, 254
See application file for complete search history.

(56) References Cited

U.S. PATENT DOCUMENTS

2008/0025336 A1    1/2008  Cho et al.
2009/0186622 A1*   7/2009  Karabinis .......... H04B 7/18563
                                                    455/446
2011/0176629 A1    7/2011  Bayesteh et al.
(Continued)

OTHER PUBLICATIONS

"Emissions Testing of Transmitters with Multiple Outputs in the Same Band (e.g., MIMO, Smart Antenna, etc)"; Oct. 31, 2013; 13 pages.

(Continued)

Primary Examiner — Chuong T Ho
(74) Attorney, Agent, or Firm — Hewlett Packard Enterprise Development LP

(57) ABSTRACT

In some examples, a method includes performing a channel sounding operation to estimate dynamic channel characteristics between an Access Point (AP) and a wireless device; determining, based on the estimated dynamic channel characteristics, whether a first transmit configuration without polarization diversity at a maximum allowable transmit power level for non-orthogonal polarity will provide a better Quality of Experience (QoE) than a second transmit configuration with polarization diversity above the maximum allowable transmit power level for non-orthogonal polarity; and transmitting a transmit stream with the second transmit configuration when it is determined that it will provide a better QoE than the first transmit configuration.

13 Claims, 7 Drawing Sheets

(56) References Cited

U.S. PATENT DOCUMENTS

| | | | |
|---|---|---|---|
| 2013/0095874 A1* | 4/2013 | Moshfeghi | H04W 88/06 |
| | | | 455/509 |
| 2015/0326274 A1* | 11/2015 | Flood | H04B 1/7143 |
| | | | 375/132 |
| 2015/0341939 A1* | 11/2015 | Sharma | H04W 72/08 |
| | | | 370/329 |

OTHER PUBLICATIONS

"MIMO with Cross-Polarized Antenna"; Oct. 25, 2011; 3 pages.

* cited by examiner

US 10,021,656 B2

ACCESS POINT TRANSMIT STREAM POLARIZATION DIVERSITY

BACKGROUND

Wireless networking can allow wireless devices, such as certain smartphones, laptops, tablets, or other suitable computing devices, to exchange data with other wired or wireless devices. In some wireless networks, a wireless device can access a wired portion of the network via one or more access points. Such access points can be designed to communicate with wireless devices at one or more radio frequencies based on capabilities of network equipment or other factors.

DETAILED DESCRIPTION

Figure 1:
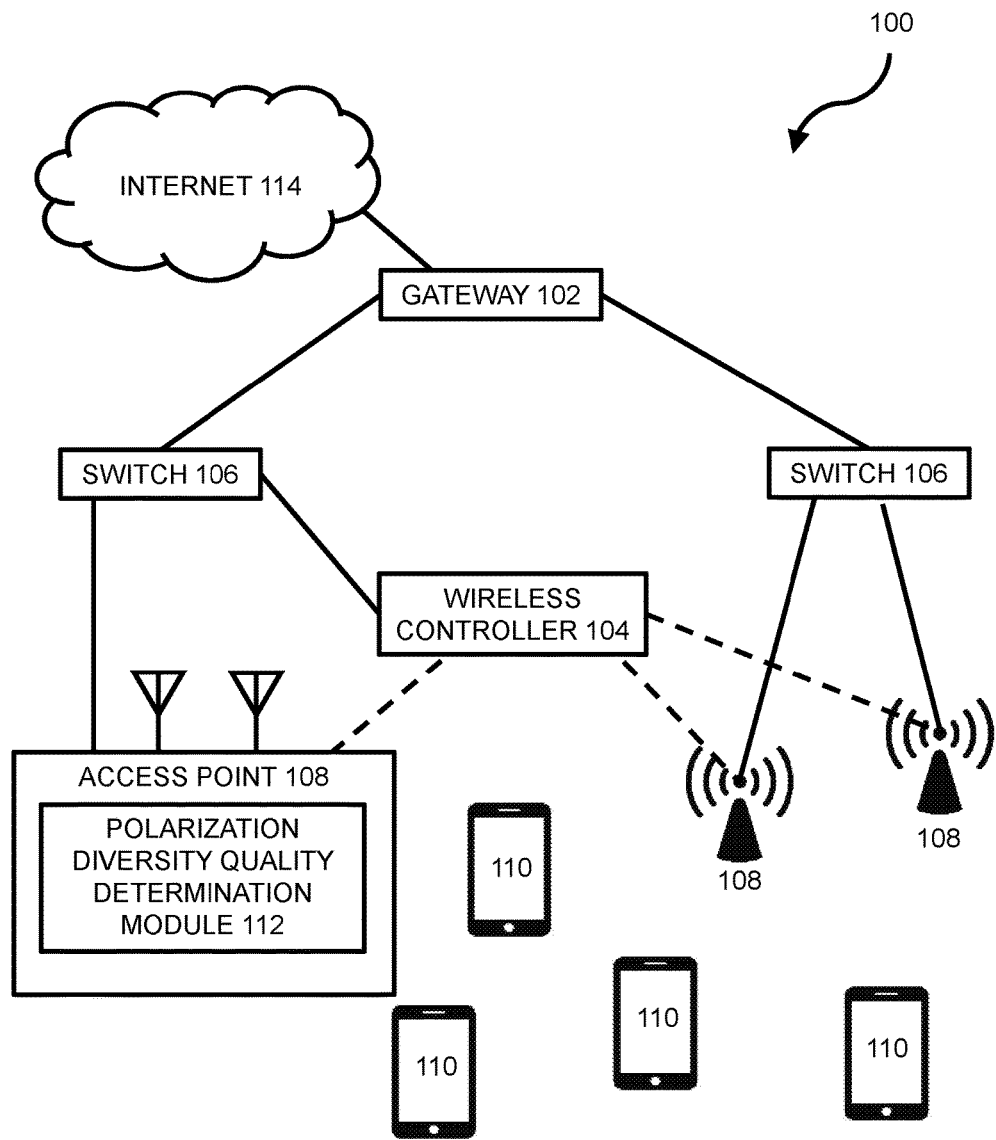
FIG. 1 is a diagram of a network environment including an access point including a polarization diversity quality determination module, according to an example.

The following discussion is directed to various examples of the disclosure. Although one or more of these examples may be preferred, the examples disclosed herein should not be interpreted, or otherwise used, as limiting the scope of the disclosure, including the claims. In addition, the following description has broad application, and the discussion of any example is meant only to be descriptive of that example, and not intended to intimate that the scope of the disclosure, including the claims, is limited to that example. Throughout the present disclosure, the terms "a" and "an" are intended to denote at least one of a particular element. In addition, as used herein, the term "includes" means includes but not limited to, the term "including" means including but not limited to. The term "based on" means based at least in part on.

In some networks, transmitter power from one or more antennas of an access point (AP) may be capped in order to comply with regulatory restricted band limits. For AP transceivers with multiple streams, such as certain 2×2, 3×3, or 4×4 Multiple-Input-Multiple-Output (MIMO) transceivers, the AP may be programmed to offset transmit power for a newly added transmit stream by reducing power on all other transmit streams of the AP. This can result in a reduction in overall power output, which can lead to a significant reduction in coverage range for the AP. For example, a 3 to 6 dB reduction in overall power output for an AP may correspond with a 50% reduction in range for the AP.

Certain implementations of the present disclosure are directed to a power control methodology that seeks to optimize AP transmit stream power by accepting transmit stream polarization configuration as an input and by applying a power offset in a dynamic fashion based on a wireless device's link quality. For example, in some implementations, a polarization of a transmitted stream may be re-oriented such that the stream's transmit power is added orthogonally with other streams transmitted by the AP. This may allow for transmit power of an individual stream to be turned up to meet a regulatory power limit, which may allow higher operational power for each orthogonal polarization domain and increased coverage range for the AP.

In some implementations, a method can include: (a) performing a channel sounding operation to estimate dynamic channel characteristics between an AP and a wireless device; (b) determining, based on the estimated dynamic channel characteristics, whether a first transmit configuration without polarization diversity at a maximum allowable transmit power level for non-orthogonal polarity will provide a better Quality of Experience (QoE) than a second transmit configuration with polarization diversity above the maximum allowable transmit power level for non-orthogonal polarity; and (c) transmitting a transmit stream with the second transmit configuration when it is determined that it will provide a better QoE than the first transmit configuration. Certain implementations of the present disclosure may allow for improved link quality, throughput, signal-to-noise ratio (SNR), etc., to a client without violating regulatory limits in any given polarization. Other advantages of implementations presented herein will be apparent upon review of the description and figures.

Figure 2:
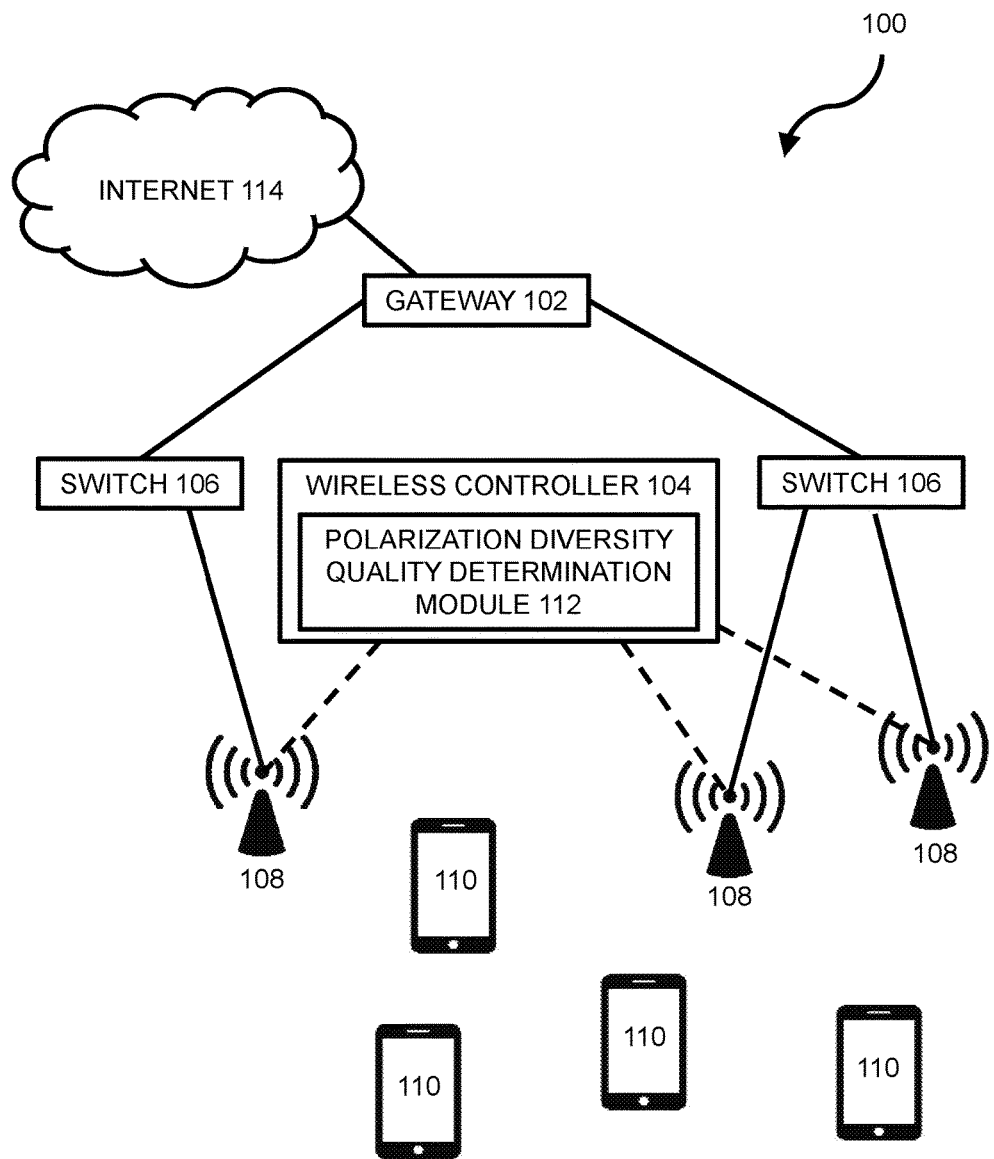
FIG. 2 is a diagram of a network environment including a wireless controller including a polarization diversity quality determination module, according to an example.

FIGS. 1 and 2 are diagrams of an example network environment 100 that includes a local area network portion including a gateway 102, a wireless controller 104, various switches 106, various APs 108, and various wireless devices 110. In environment 100 of FIG. 1, one of APs 108 includes a polarization diversity quality determination module 112 as described in further detail below, whereas in environment 100 of FIG. 2, wireless controller 104 includes polarization diversity quality determination module 112. The structure and functionality of the various aspects of environment 100 are described in further detail below.

The terms "access point" or "AP" as used herein, can, for example, refer to networking hardware device that allows a Wi-Fi compliant device to connect to a wired network. Such an AP 108 may be connected to an upstream wired device, such as switch 106, wireless controller 104, etc., via an Ethernet connection and may provide one or more downstream wireless connections using Radio Frequency (RF) links for other wireless devices to use a wired connection. AP 108 can support one or more industry standards for sending and receiving data using these radio frequencies, such as the Institute of Electrical and Electronics Engineers (IEEE) 802.11 standard or other suitable standards. AP 108 can, for example, be in the form of a standalone device connected to a gateway (e.g., gateway 102), router, or other intermediate datapath device. In some implementations, AP 108 may be an integral component of such an intermediate datapath device or other network equipment.

As used herein, the term "wireless controller" can, for example, refer to any suitable entity that handles control and management functions of a network or equipment thereof. For example, wireless controller 104 can be used to control one or more aspects of APs 108, such as channel assignment, beamforming, radio resource management (RRM), etc. In some implementations, applications can run on wireless controller 104 or on other devices on the network (or otherwise in communication with the network) to meet customer use cases, such as to achieve a desired throughput (or another Quality of Service (QoS)) over the network, enforce security provisions or access control policies for the network, or provide another suitable service or functionality.

In some implementations, wireless controller 104 can allow for the decoupling of traffic routing control decisions (e.g., which port of a given switch should be used to forward traffic to a given destination) from the network's physical infrastructure. For example, in some implementations, wireless controller 104 can be in the form of an SDN controller and switches 106 can be in the form of SDN-enabled switches that are within the control domain of the SDN controller. In some environments, one or more network nodes within environment 100 may be deemed to be "controlled" by another device, such as wireless controller 104. As used herein, the term "controlled" can, for example, refer to devices within the control domain of the wireless controller 104 or otherwise controllable by wireless controller 104. Such a controlled node can, for example, communicate with wireless controller 104 and can allow wireless controller 104 to manage the node in accordance with a protocol. For example, an OpenFlow-compatible switch controlled by a wireless controller 104 with SDN capabilities may permit controller 104 to add, update, and delete flow entries in flow tables of switch 106 using suitable commands.

In some network environments, a data packet may be routed from a given switch 106 to a given wireless device 110 through one or more data paths that may include wireless links (e.g., a wireless link between AP 108 and wireless device 110). For example, in some network environments, a data packet may be routed to wireless device 110 along a first datapath that uses a first AP 108 or alternatively along a second datapath that uses a second AP 108. A given data path for data packets within environment 100 can be determined by wireless controller 104 (or another entity, such as by a network administrator, by datapath nodes themselves, etc.) based on one or more static parameters (e.g., link speeds, number of hops between nodes, etc.) and can further (or alternatively) be based on one or more dynamic parameters (e.g., QoS, network latency, network throughput, network power consumption, etc.).

Network nodes within environment 100 can forward traffic along a datapath based on metadata within the traffic. For example, traffic in the form of a packet can be received at switch 106 (or another suitable intermediary network node). For consistency, the industry term "packet" is used throughout this description, however, it is appreciated that the term "packet" as used herein can refer to any suitable protocol data unit (PDU). Such a packet can, for example, include payload data as well as metadata in the form of control data. Control data can, for example, provide data to assist the network node with reliably delivering payload data. For example, control data can include network addresses for source and destination nodes (e.g., wireless device 110), error detection codes, sequencing information, packet size of the packet, a time-to-live (TTL) value, etc. In contrast, payload data can include data carried on behalf of an application for use by source and destination nodes.

The functionality of wireless controller 104 or other network equipment within environment 100 can, for example, be implemented in part via a software program on a standalone machine, such as a standalone server. In some implementations, wireless controller 104 can be implemented on one or more multi-purpose machines, such as a suitable desktop computer, laptop, tablet, or the like. In some implementations, wireless controller 104 can be implemented on a suitable non-host network node, such as certain types of network switches. In some implementations, the functionality of wireless controller 104 can be implemented within the hardware and software of an AP (e.g., AP 108). It is appreciated that the functionality of wireless controller 104 may be split among multiple controllers or other devices. For example, environment 100 is described and illustrated as including only one wireless controller 104. However, it is appreciated that the disclosure herein can be implemented in networks with multiple controllers. For example, in some networks, network devices are in communication with multiple controllers such that control of the network can be smoothly handed over from a first controller to a second controller if a first controller fails or is otherwise out of operation. In some implementations, or more wireless controllers 104 can operate in a distributed fashion over multiple appliances but present themselves as a single entity to the network.

As another example, multiple controllers can be used to work together to concurrently control certain networks. In such networks, a first controller can, for example, control certain network devices while a second controller can control other network devices. In view of the above, reference in this application to a single wireless controller 104 that controls the operation of network devices in environment 100 is intended to also include such multiple controller configurations (and other suitable multiple controller configurations).

Wireless devices 110 can, for example, be in the form of network hosts or other types of network nodes. Wireless devices 110 are depicted as mobile phones in FIGS. 1 and 2, however such clients can be in the form of any suitable device that can transmit and receive wireless data with an AP 108. For example, in some implementations, wireless devices 110 can be in the form of suitable mobile phones, tablets, laptops, servers, desktop computers, printers, APs, wireless sensors, beacons, Internet of Things (IoT) devices, wireless clients, etc. In certain implementations, one or more wireless devices 110 can be in the form of a desktop computer including a monitor for presenting information to an operator and a keyboard and mouse for receiving input from an operator and one or more wireless devices 110 can be in the form of smart phones. It is appreciated that wireless devices 110 can be endpoint nodes of environment 100 (such as depicted in FIGS. 1 and 2), intermediate nodes between endpoint nodes, or positioned at other logical or physical locations within environment 100. In some implementations, wireless devices 110 may have various MIMO capabilities, such as for example number of antennas. It is further appreciated that one or more of such antennas may have their own fixed or variable polarity relative to the AP 108. For example, in some implementations, one or more wireless devices 110 may perform better in a 4×4 AP system if a transmit stream is cross-polarized with increased power.

Various intermediary nodes within the network environment can, for example, be in the form of switches (e.g., switches 106) or other multi-port network bridges that process and forward data at the data link layer. In some implementations, one or more of the nodes can be in the form of multilayer switches that operate at multiple layers of the Open Systems Connection (OSI) model (e.g., the data link and network layers). Although the term "switch" is used throughout this description, it is appreciated that this term can refer broadly to other suitable network data forwarding devices. For example, a general purpose computer can include suitable hardware and machine-readable instructions that allow the computer to function as a network switch. It is appreciated that the term "switch" can include other network datapath elements in the form of suitable routers, gateways and other devices that provide switch-like functionality for the network. Gateway 102 can, for example, be in the form of a network node that acts as an entrance to another network, such as Internet 114 or another suitable Wide Area Network (WAN) or Local Area Network (LAN).

The various nodes within network environment 100 are connected via one or more data channels (shown in solid lines), which can, for example be in the form of data cables or wireless data channels. Although a single link (i.e., a single line in FIGS. 1 and 2) between each network node is illustrated, it is appreciated that each single link may include multiple wires or other wired or wireless data channels. Moreover, FIGS. 1 and 2 further depict wireless controller 104 as being connected to APs 108 via broken lines, which is intended to illustrate logical control channels between wireless controller 104 and APs 108. However, it is appreciated that wireless controller 104 may be directly connected to only one or a few APs, while being indirectly connected to other nodes of the network. For example, wireless controller 104 can be directly connected to a first AP via an Ethernet cable, while being indirectly connected to a second AP (e.g., by relying on the first AP to wireless communicate to the second AP control signals for the second AP or via a wired connection between the first and second APs). In certain implementations, the functionality and/or equipment for wireless controller 104 can reside within Internet 114 or another network.

In the example environment 100 depicted in FIGS. 1 and 2, the various network nodes are in the form of intermediary nodes (e.g., switches 106, gateway 102, APs 108), a controller node (e.g., wireless controller 104), and host devices (wireless devices 110). It is appreciated however, that the implementations described herein can be used or adapted for networks including more or fewer devices, different types of devices, and different network arrangements. As an example, in some implementations, wireless controller 104 may operate as an intermediary node or a host device. As another example, in some implementations, such as in certain mesh networks, a backhaul of the network may be wireless instead of wired. In such an implementation, an AP may wirelessly relay data to another AP that is connected to the wired backbone, to thereby use a wireless link between two APs as a wireless backhaul.

Figure 3:
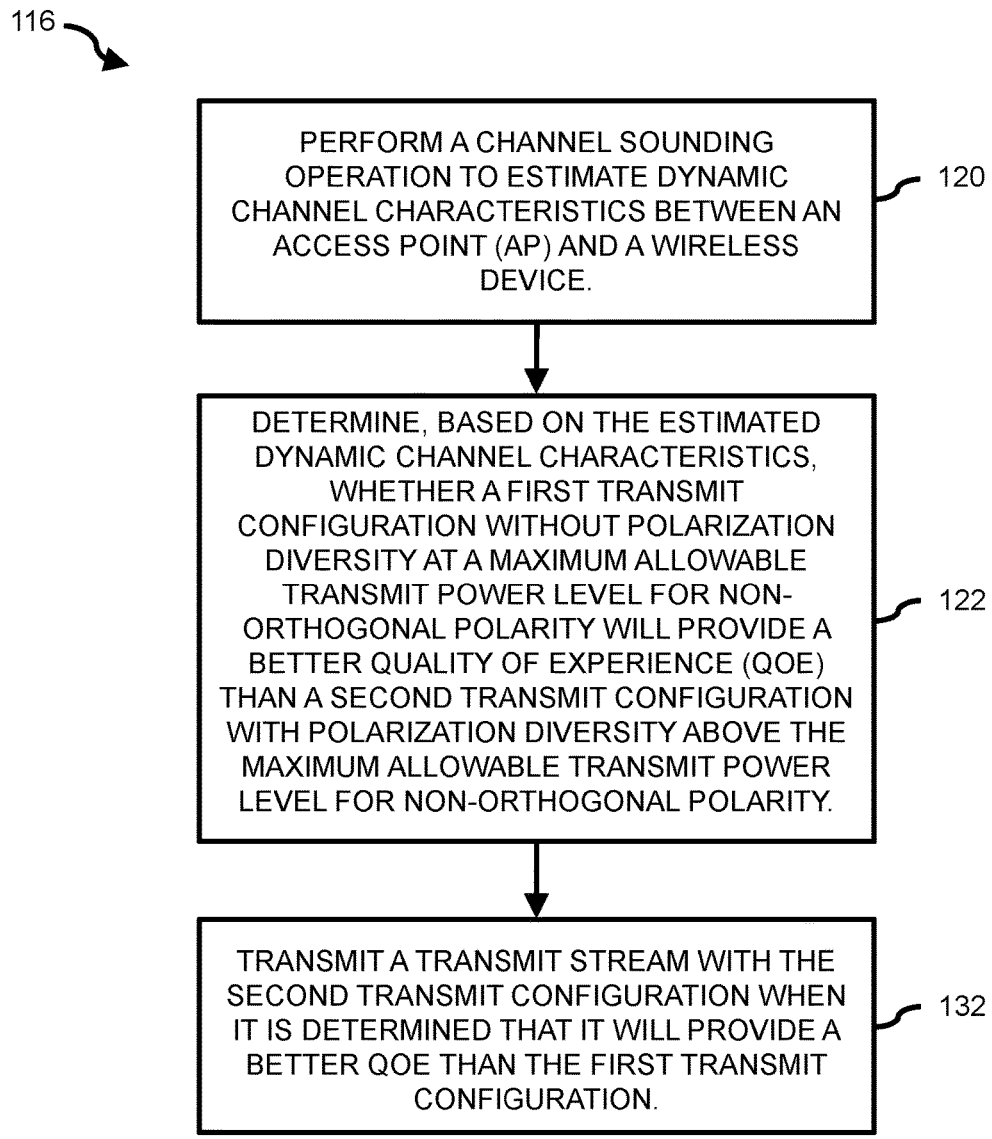
FIG. 3 is a flowchart for a method, according to an example.
Figure 4:
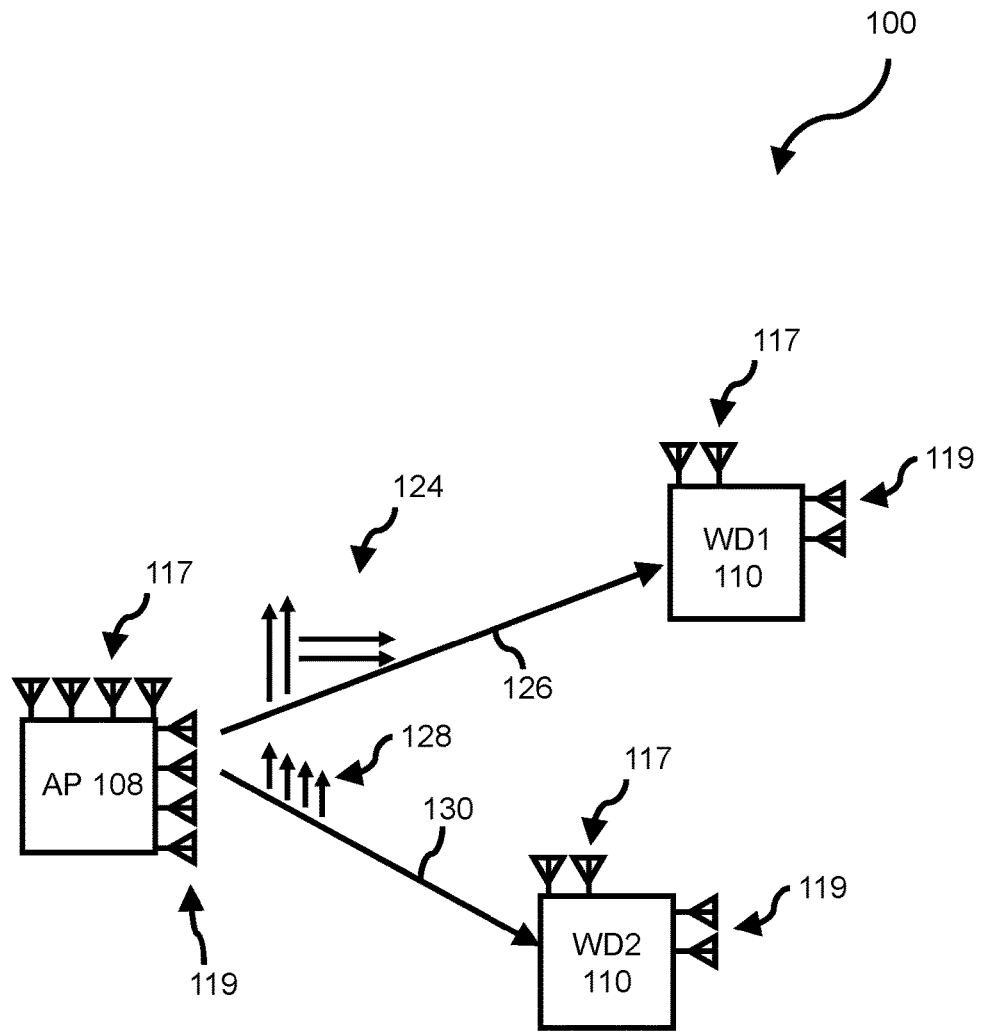
FIG. 4 is a diagram depicting transmit streams between an access point and two wireless devices, according to an example.

FIGS. 3 and 4 illustrate an example implementation of the present disclosure. In particular, FIG. 3 depicts a flowchart for an example method 116 related to AP transmit stream polarization diversity and FIG. 4 is an example diagram that depicts transmit streams between an AP and two wireless devices, according to an example. For illustration, the description of method 116 and its component steps make reference to the example network environment 100 of FIGS. 1 and 2 and elements thereof, such as for example APs 108, wireless devices 110, etc. Moreover, network environment 100 of FIG. 4 depicts one AP 108 with eight antennas and two wireless devices 110, with four antennas each. However, it is appreciated that method 116 or aspects thereof can be used or otherwise applicable for any suitable network or network element described herein or otherwise. For example, method 116 can be applied to an environment 100 with a different number of APs 108, wireless devices 110, and/or antennas 118.

In some implementations, method 116 can be implemented or otherwise executed through the use of executable instructions stored on a memory resource (e.g., the memory resource of the computing device of FIG. 6), executable machine readable instructions stored on a storage medium (e.g., the medium of FIG. 7), in the form of electronic circuitry (e.g., on an Application-Specific Integrated Circuit (ASIC)), and/or another suitable form. Although the description of method 116 herein primarily refers to steps performed on AP 108 for purposes of illustration, it is appreciated that in some implementations, method 116 can be executed on another computing device within network environment 100 (e.g., wireless controller 104) or in data communication with network environment 100. In some implementations, method 116 can be executed on network devices in parallel (e.g., in a distributed computing fashion).

Method 116 includes performing (at block 120) a channel sounding operation to estimate dynamic channel characteristics between AP 108 and one of wireless devices 110. As used herein, the term "channel sounding" can, for example, refer to a technique to evaluate a radio environment for wireless communication. In some implementations, block 120 can include transmitting a broadband multi-tone test signal. In such an operation, a continuous periodic test sequence that arrives at a receiver can be correlated with an original transmitted sequence. This correlation data or other suitable feedback data may then be analyzed to estimate dynamic channel characteristics. The estimated dynamic channel characteristics can, for example, broadly include characteristics relating to channel frequency, time, and position of devices within the channel. In some implementations, one or more dynamic channel characteristics can include characteristics relating to Direction of departure (DOD), Direction of arrival (DOA), Time delay, Doppler shift, and complex polarimetric path weight matrix.

Method 116 includes determining (at block 122), based on the estimated dynamic channel characteristics, whether a first transmit configuration without polarization diversity at a maximum allowable transmit power level for non-orthogonal polarity will provide a better QoE than a second transmit configuration with polarization diversity above the maximum allowable transmit power level for non-orthogonal polarity. As used herein, the term "polarization diversity" can, for example, refer to an RF configuration that uses diverse antennas 118. As used herein, the term "antenna" can, for example, refer to a single-band antenna, a polarized antenna, a dual-band antenna, a Wi-Fi antenna, a GPS antenna, or any other suitable wireless antenna. In some implementations, the diverse antennas may include vertically polarized antennas 118 and horizontally polarized antennas 118. In other examples, diverse antennas 118 may be spatially diverse, sectorized, or the like. As used herein, the term "vertically polarized antenna" can, for example, refer to an antenna that can emit and receive vertically polarized waves. Such a vertically polarized antenna may be in the form of a linear polarized antenna that is physically oriented in a vertical direction and has an electric field perpendicular to a reference point. As used herein, the term "horizontally-polarized antenna" can, for example, refer to an antenna that can emit and receive horizontally polarized waves. Such a horizontally polarized antenna may be in the form of a linear-polarized antenna that is physically oriented in a horizontal direction and has an electric field parallel to a reference point. It is appreciated that there may be multiple configurations "with polarization diversity" and multiple configurations "without polarization diversity." For example, in a 4×4 system, "without polarization diversity configurations" may include VVVV and HHHH configurations, whereas "with Polarization Diversity configurations" may include VVVH, VVHH, VHHH, VHVH, etc., configurations. In some implementations of method 116, AP 108 may know a polarization of a particular wireless devices polarization and can automatically switch to a known best polarity configuration without performing a channel sounding operation or determining QoE. For example AP 108 may be programmed to use a polarization diversity configuration of VHVH for a specific model smart phone because it was previously calculated that such a configuration would provide 80% better throughput to that model of smart phone. In such a situation, once AP 108 determines that it is talking to a specific model smart phone (e.g., through a programmed or learned database), then AP 108 may be automatically assigned with a given polarization diversity configuration. It is appreciated that the present disclosure's use of "vertical" and "horizontal" are one example of an orthogonal domain relative to AP 108 and that any other suitable angle of polarity relative to AP 108 are envisioned, such as for example, other polarities that are 90 degrees apart from each other.

The environment 100 of FIG. 4 depicts AP 108 with four vertically polarized antennas 118 positioned at the top of AP 108 and four horizontally polarized antennas 118 positioned on the right side of AP 108. A first wireless device (WD1) of FIG. 4 includes two vertically polarized antennas 117 positioned at the top of WD1 and two horizontally polarized antennas 119 positioned on the right side of WD1. Likewise, a second wireless WD (WD2) of FIG. 4 includes two vertically polarized antennas 117 positioned at the top of WD2 and two horizontally polarized antennas 119 positioned on the right side of WD2. It is appreciated, that the numbers, positions, and orientations of antennas described herein for environment 100 of FIG. 4 are for illustration only, and that APs 108 and wireless devices 110 with different numbers, positions, and orientations of antennas may be used. Block 122 relies on certain estimated estimate dynamic channel characteristics determined from block 120. For example, in the environment 100 of FIG. 4, an estimated distance between AP 108 and WD1 may be determined to be longer than an estimated distance between AP 108 and WD2. As a result, block 122 may determine that AP 108 can provide a better QoE to WD1 by employing polarization diversity at a higher transmit power (depicted using larger arrows 124 for stream 126) compared to a lower transmit power for WD2 (depicted using smaller arrows 128 for stream 130) that does not employ polarization diversity. It is appreciated that this is a simple example and that more complicated transmit stream power optimizations to improve QoE may be performed by accepting transmit stream polarization configuration as an input.

As used herein, the term "Quality of Experience" and "QoE" can, for example, refer to a measure of a client's experiences with a service. Such a QoE can, for example, be based on the achievement of one or more quality-of-service ("QoS") metrics. Such, QoS metrics can, for example, refer to acceptable bandwidths, latencies, error rates, jitter rates, and the like. QoE and QoS can, for example, be implemented to help ensure a quality experience when using time-sensitive network services, such as real-time multimedia services including Internet Protocol television (IPTV), video calls, online gaming, security camera streams, Voice over IP (VoIP) traffic, or other services. In some implementations, the determination of better QoE is based on throughput between AP 108 and wireless device 110, signal strength between the AP and wireless device, polarity configuration of antennas 118 of the wireless device, and/or other suitable metrics.

It is appreciated that a determination whether one transmit configuration provides a "better" QoE than another transmit configuration can be based on numerous factors. For example, a given transmit configuration can be determined to be "better" than another transmit configuration because it provides or is predicted to provide one or more of the following: greater throughput, lower latencies, error, or jitter rates, etc. It is further appreciated that a given transmit configuration can be determined to be "better" based on other factors, such as a preference of a network administrator.

In some implementations, the second transmit configuration of block 122 can have a transmit power level above the maximum allowable transmit power level for non-orthogonal polarity and below a maximum allowable transmit level for orthogonal polarity. The maximum allowable transmit power level for non-orthogonal polarity can, for example, be calculated based on a maximum allowable transmit power level for non-orthogonal polarity is based on a vector summation of individual powers of transmit streams in any point in space and the maximum allowable transmit level for orthogonal polarity is based on a vector sum of individual powers of transmit streams in any point in space. The maximum allowable transmit level for orthogonal polarity can, for example, be based on a vector sum of individual powers of transmit streams. As used herein, the term "maximum allowable transmit levels" as used herein can, for example, refer to a regulatory restricted band limits for power transmission. Such a limit can be based on a Federal Communications Commission (FCC) rule for a given band frequency (e.g., 2.4 GHz and 5 GHZ band rules) relating to maximum power from an intentional radiator, maximum antenna gain, equivalent isotropically radiated power (EIRP), for an AP.

Method 116 includes transmitting (at block 132) a transmit stream with the second transmit configuration when it is determined from block 122 that it will provide a better QoE than the first transmit configuration. For example, in a 4×4 antenna array, four streams of transmit may be sent over four or more antennas (e.g., AP 108 of FIG. 4 with four vertically polarized antennas 117 and four horizontally polarized antennas 119). As used herein, the term "transmitting" can, for example, refer to the generation of an RF alternating current applied to an antenna. When the antenna is excited by this alternating current, the antenna can radiate radio waves. In the context of a MIMO-capable AP 108, multiple radio chains (and hence multiple antennas) can be used at both the transmitter and the receiver to help increase the throughput and transmit larger amounts of data over the wireless link. MIMO can, for example, take advantage of the multiple transmit and receive radio chains via Spatial Division Multiplexing (SDM) to send multiple streams of data simultaneously on a single channel, which may thereby increase data rate and overall throughput.

It is appreciated that one or more operations of method 116 can be performed periodically. For example, in some implementations, one or more of blocks 120, 122, and 132 (or other operations described herein) may be performed periodically. The various period times for blocks 120, 122, and 132 (or other operations described herein) may be the same or different times. For example, in some implementations, the period of block 120 is every 1 minute and the period of block 122 is every 10 minutes. It is further appreciated, that the period for a given block may be regular (e.g., every 1 minute) or may be irregular (e.g., every 1 minute during a first network condition, and every 5 minutes during a second network condition). In some implementations, one or more of block 120, 122, and 132 (or other operations described herein) may be non-periodic and may be triggered by some network or other event.

Although the flowchart of FIG. 3 shows a specific order of performance, it is appreciated that this order may be rearranged into another suitable order, may be executed concurrently or with partial concurrence, or a combination thereof. Likewise, suitable additional and/or comparable steps may be added to method 116 or other methods described herein in order to achieve the same or comparable functionality. In some implementations, one or more steps are omitted. For example, in some implementations, block 120 of performing a channel sounding operation can be omitted from method 116 or performed by a different device. It is appreciated that blocks corresponding to additional or alternative functionality of other implementations described herein can be incorporated in method 116. For example, blocks corresponding to the functionality of various aspects of implementations otherwise described herein can be incorporated in method 116 even if such functionality is not explicitly characterized herein as a block in method 116.

Figure 5:
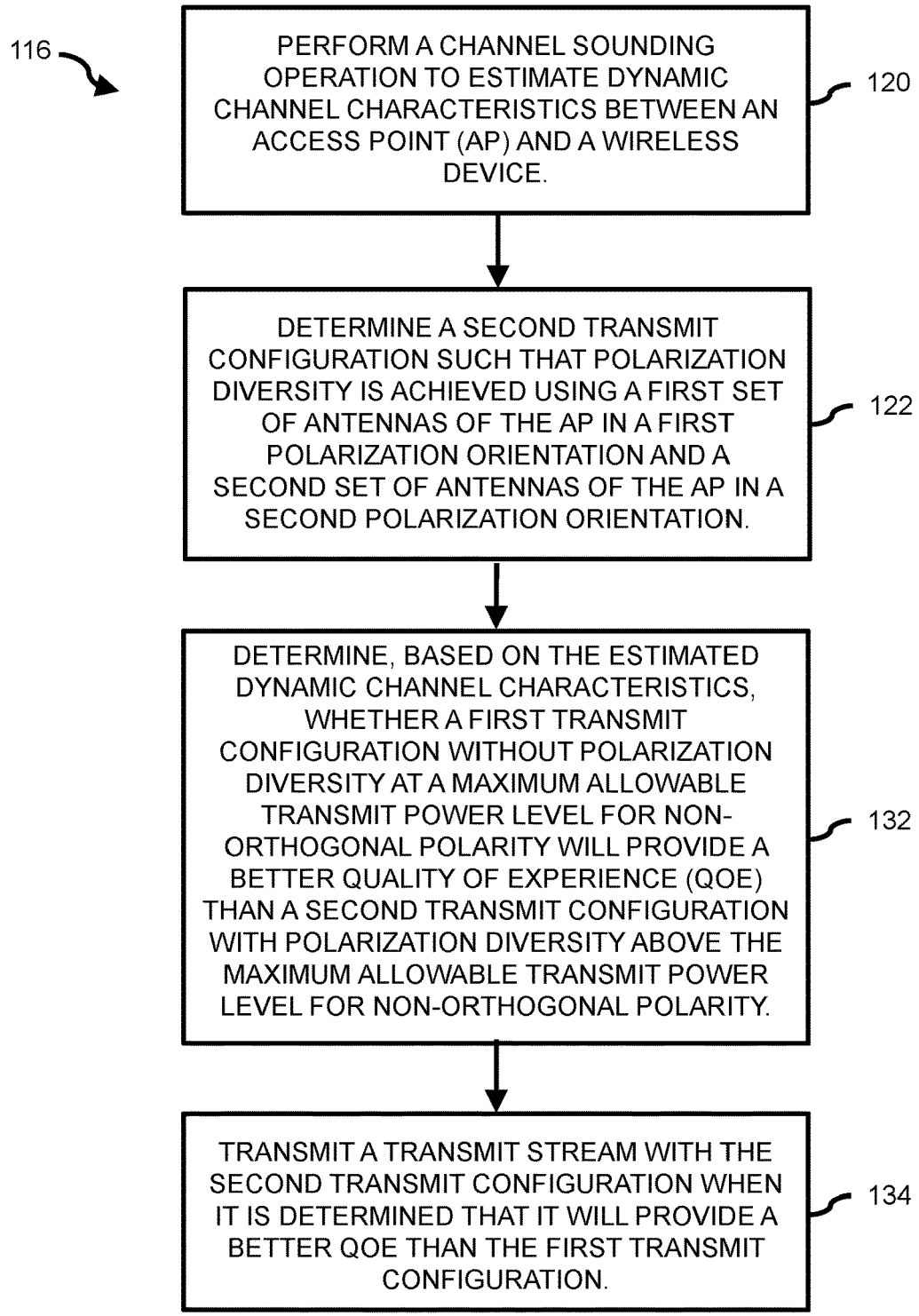
FIG. 5 is a flowchart for a method, according to another example.

FIG. 5 illustrates another example of method 116 in accordance with the present disclosure. For illustration, FIG. 5 reproduces various blocks from method 116 of FIG. 3, however it is appreciated that method 116 of FIG. 5 can include additional, alternative, or fewer steps, functionality, etc., than method 116 of FIG. 3 and is not intended to be limited by the diagram of FIGS. 1, 2, and 4 (or vice versa) or the related disclosure thereof. It is further appreciated that method 116 of FIG. 3 can incorporate one or more aspects of method 116 of FIG. 5 and vice versa. For example, in some implementations, method 116 of FIG. 3 can include the additional step described below with respect to method 116 of FIG. 5.

Method 116 of FIG. 5 includes determining (at block 134) the second transmit configuration such that polarization diversity is achieved using a first set of antennas (e.g., antennas 118) of AP 108 in a first polarization orientation and a second set of antennas (e.g., antennas 118) of AP 108 in a second polarization orientation. In some implementations, method 116 can include determining a second transmit configuration such that polarization diversity is achieved using a first set of antennas (e.g., antennas 118) of AP 108 in a first polarization orientation and a second set of antennas (e.g., antennas 118) of AP 108 in a second polarization orientation. As depicted in the environment of FIG. 4, the first polarization orientation can be vertical and the second polarization can be horizontal. It is appreciated that polarization diversity can be achieved using other antenna orientations, such as slant 45° (or another suitable angle), circular polarized antennas, etc. Block 134 can, for example, rely on an algorithm running on AP 108 or another network device (e.g., controller 104) that seeks to optimize a set of metrics (such as throughput, Received Signal Strength Indicator (RSSI), number of retries, and transmit power). With reference to transmit power, a higher transmit power can, for example, result in a higher SNR at wireless device 110, which may allow for a higher throughput, or alternatively allow for a longer distance to device 110 for the same throughput.

Figure 6:
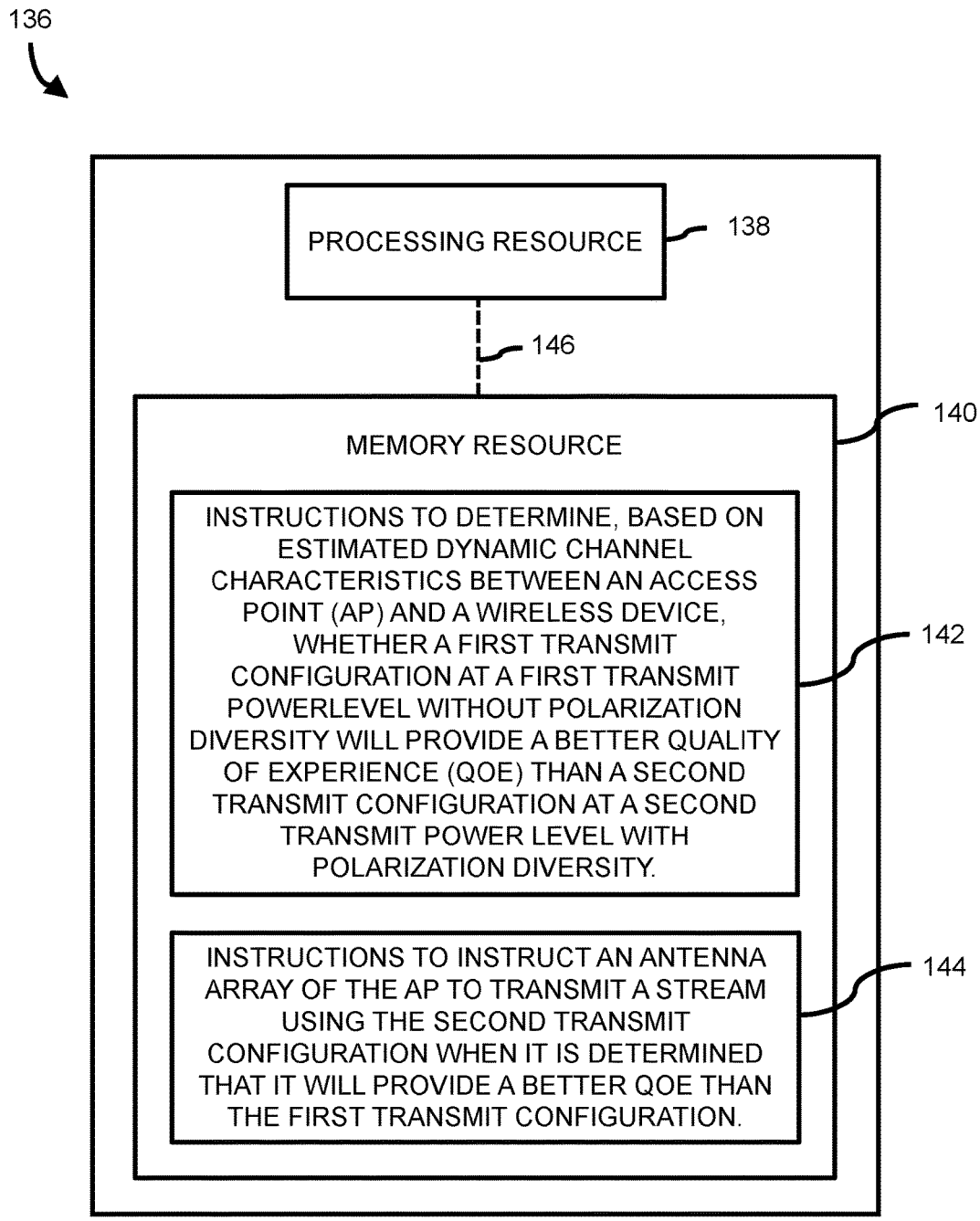
FIG. 6 is a diagram of a computing device, according to an example.

FIG. 6 is a diagram of a computing device 136 in accordance with the present disclosure. Computing device 136 can, for example, be in the form of an AP (e.g., AP 108), a wireless controller (e.g., wireless controller 104), or another suitable computing device within network environment 100 or in communication with network environment 100 or equipment thereof. In some implementations, the computing device can be a wireless controller 104 integrated in AP 108. In some implementations, computing device 136 is a wireless controller device (e.g., wireless controller 104) that is separate from AP 108. As described in further detail below, computing device 136 includes a processing resource 138 and a memory resource 140 that stores machine-readable instructions 142 and 144. For illustration, the description of computing device 136 makes reference to various aspects of the diagrams of FIGS. 1, 2, and 4, as well as method 116 of FIGS. 3 and 5. However it is appreciated that computing device 136 can include additional, alternative, or fewer aspects, functionality, etc., than the implementations described elsewhere herein and is not intended to be limited by the related disclosure thereof.

Instructions 142 stored on memory resource 140 are, when executed by processing resource 138, to cause processing resource 138 to determine, based on estimated dynamic channel characteristics between an AP 108 and a wireless device 110, whether a first transmit configuration at a first transmit power level without polarization diversity will provide a better QoE than a second transmit configuration at a second transmit power level with polarization diversity. Instructions 142 can incorporate one or more aspects of blocks of method 116 or another suitable aspect of other implementations described herein (and vice versa). For example, in some implementations, the estimated dynamic channel characteristics between AP 108 and wireless device 110 can be calculated using a channel sounding operation.

Instructions 144 stored on memory resource 140 are, when executed by processing resource 138, to cause processing resource 138 to instruct an antenna array of AP 108 to transmit a stream using the second transmit configuration when it is determined that it will provide a better QoE than the first transmit configuration. Instructions 130 can incorporate one or more aspects of blocks of method 116 or another suitable aspect of other implementations described herein (and vice versa). For example, in some implementations, instructions 144 can be performed by a processor housed within AP 108, or by other network equipment, such as a separate wireless controller 104. In implementations where wireless controller 104 executes instructions 144, controller 104 may instruct an antenna array of AP 108 to transmit the stream using the second transmit configuration. In implementations where AP 108 executes instructions 144, AP 108 may instruct its own antenna array to transmit the stream using the second transmit configuration.

Processing resource 138 of computing device 136 can, for example, be in the form of a central processing unit (CPU), a semiconductor-based microprocessor, a digital signal processor (DSP) such as a digital image processing unit, other hardware devices or processing elements suitable to retrieve and execute instructions stored in memory resource 140, or suitable combinations thereof. Processing resource 138 can, for example, include single or multiple cores on a chip, multiple cores across multiple chips, multiple cores across multiple devices, or suitable combinations thereof. Processing resource 138 can be functional to fetch, decode, and execute instructions as described herein. As an alternative or in addition to retrieving and executing instructions, processing resource 138 can, for example, include at least one integrated circuit (IC), other control logic, other electronic circuits, or suitable combination thereof that include a number of electronic components for performing the functionality of instructions stored on memory resource 140. The term "logic" can, in some implementations, be an alternative or additional processing resource to perform a particular action and/or function, etc., described herein, which includes hardware, e.g., various forms of transistor logic, application specific integrated circuits (ASICs), etc., as opposed to machine executable instructions, e.g., software firmware, etc., stored in memory and executable by a processor. Processing resource 138 can, for example, be implemented across multiple processing units and instructions may be implemented by different processing units in different areas of computing device 136.

Memory resource 140 of computing device 136 can, for example, be in the form of a non-transitory machine-readable storage medium, such as a suitable electronic, magnetic, optical, or other physical storage apparatus to contain or store information such as machine-readable instructions 142 and 144. Such instructions can be operative to perform one or more functions described herein, such as those described herein with respect to method 116 or other methods described herein. Memory resource 140 can, for example, be housed within the same housing as processing resource 138 for computing device 136, such as within a computing tower case for computing device 136 (in implementations where computing device 136 is housed within a computing tower case). In some implementations, memory resource 140 and processing resource 138 are housed in different housings. As used herein, the term "machine-readable storage medium" can, for example, include Random Access Memory (RAM), flash memory, a storage drive (e.g., a hard disk), any type of storage disc (e.g., a Compact Disc Read Only Memory (CD-ROM), any other type of compact disc, a DVD, etc.), and the like, or a combination thereof. In some implementations, memory resource 140 can correspond to a memory including a main memory, such as a Random Access Memory (RAM), where software may reside during runtime, and a secondary memory. The secondary memory can, for example, include a nonvolatile memory where a copy of machine-readable instructions are stored. It is appreciated that both machine-readable instructions as well as related data can be stored on memory mediums and that multiple mediums can be treated as a single medium for purposes of description.

Memory resource 140 can be in communication with processing resource 138 via a communication link 146. Each communication link 146 can be local or remote to a machine (e.g., a computing device) associated with processing resource 138. Examples of a local communication link 146 can include an electronic bus internal to a machine (e.g., a computing device) where memory resource 140 is one of volatile, non-volatile, fixed, and/or removable storage medium in communication with processing resource 138 via the electronic bus.

In some implementations, one or more aspects of computing device 136 (e.g., AP 108, wireless controller 104, or other devices of a wireless network) can be in the form of functional modules that can, for example, be operative to execute one or more processes of instructions 142 or 144 or other functions described herein relating to other implementations of the disclosure. As used herein, the term "module" refers to a combination of hardware (e.g., a processor such as an integrated circuit or other circuitry) and software (e.g., machine- or processor-executable instructions, commands, or code such as firmware, programming, or object code). A combination of hardware and software can include hardware only (i.e., a hardware element with no software elements), software hosted at hardware (e.g., software that is stored at a memory and executed or interpreted at a processor), or hardware and software hosted at hardware. It is further appreciated that the term "module" is additionally intended to refer to one or more modules or a combination of modules. Each module of computing device 136 can, for example, include one or more machine-readable storage mediums and one or more computer processors.

In view of the above, it is appreciated that the various instructions of computing device 136 described above can correspond to separate and/or combined functional modules. For example, instructions 142 can correspond to a "polarization diversity quality determination module" (e.g., module 112 of FIGS. 1 and 2) to determine, based on the estimated dynamic channel characteristics, whether a first transmit configuration without polarization diversity at a maximum allowable transmit power level for non-orthogonal polarity will provide a better QoE than a second transmit configuration with polarization diversity above the maximum allowable transmit power level for non-orthogonal polarity. Likewise, instructions 144 can correspond to a transmission module including an antenna array to transmit a transmit stream. It is further appreciated that a given module can be used for multiple functions. As but one example, in some implementations, a single module can be used to both determine a QoE (e.g., corresponding to the functionality of instructions 142) as well as to transmit a transmit stream (e.g., corresponding to the functionality of instructions 144).

One or more nodes within the network environment 100 (e.g., wireless controller 104, AP 108, etc.) can further include a suitable communication module to allow networked communication between network equipment. Such a communication module can, for example, include a network interface controller having an Ethernet port and/or a Fibre Channel port. In some implementations, such a communication module can include wired or wireless communication interface, and can, in some implementations, provide for virtual network ports. In some implementations, such a communication module includes hardware in the form of a hard drive, related firmware, and other software for allowing the hard drive to operatively communicate with other hardware of wireless controller 104, AP 108, or other network equipment. The communication module can, for example, include machine-readable instructions for use with communication the communication module, such as firmware for implementing physical or virtual network ports.

Figure 7:
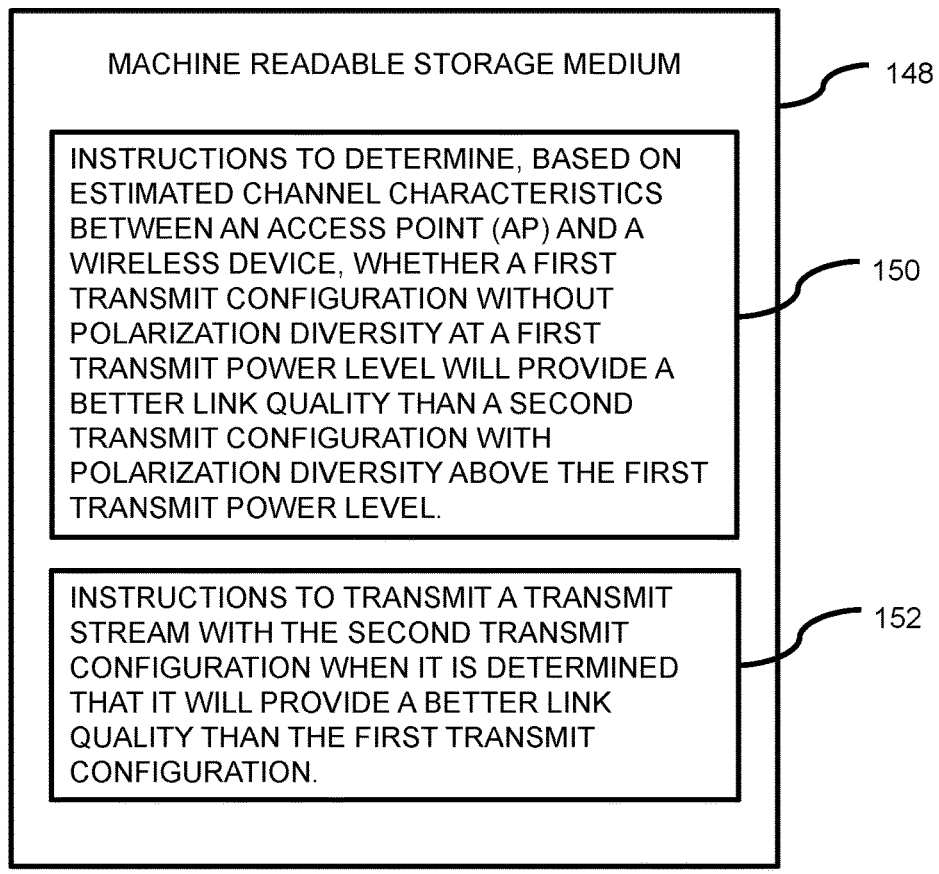
FIG. 7 is a diagram of machine-readable storage medium, according to an example.

FIG. 7 illustrates a machine-readable storage medium 148 including various instructions that can be executed by a computer processor or other processing resource. In some implementations, medium 148 can be housed within an AP, such as AP 108, a wireless controller, such as wireless controller 104, or on another computing device within network environment 100 or in local or remote wired or wireless data communication with network environment 100. For illustration, the description of machine-readable storage medium 148 provided herein makes reference to various aspects of computing device 136 (e.g., processing resource 138) and other implementations of the disclosure (e.g., method 116). Although one or more aspects of computing device 136 (as well as instructions such as instructions 142 and 144) can be applied to or otherwise incorporated with medium 148, it is appreciated that in some implementations, medium 148 may be stored or housed separately from such a system. For example, in some implementations, medium 148 can be in the form of Random Access Memory (RAM), flash memory, a storage drive (e.g., a hard disk), any type of storage disc (e.g., a Compact Disc Read Only Memory (CD-ROM), any other type of compact disc, a DVD, etc.), and the like, or a combination thereof.

Medium 148 includes machine-readable instructions 150 stored thereon to cause processing resource 138 to determine, based on estimated channel characteristics between AP 108 and wireless device 110, whether a first transmit configuration without polarization diversity at a first transmit power level will provide a better link quality than a second transmit configuration with polarization diversity above the first transmit power level. In some implementations, the first transmit power level is the maximum allowable transmit power for a stream with non-orthogonal polarity. Instructions 150 can, for example, incorporate one or more aspects of block 122 of method 116 or another suitable aspect of other implementations described herein (and vice versa). For example, in some implementations, link quality can be determined based on a desired QoE, QoS, throughput, RSSI, or other metric for a connection between AP 108 and wireless device 110.

Medium 148 includes machine-readable instructions 152 stored thereon to cause processing resource 138 to transmit a transmit stream with the second transmit configuration when it is determined that it will provide a better link quality than the first transmit configuration. Instructions 152 can, for example, incorporate one or more aspects of block 132 of method 116 or another suitable aspect of other implementations described herein (and vice versa). For example, in some implementations, the transmit stream can be transmitted using multiple antennas 118 employing a polarization diversity configuration.

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. Furthermore, it should be appreciated that the systems and methods described herein can include various combinations and/or sub-combinations of the components and/or features of the different implementations described. Thus, features described with reference to one or more implementations can be combined with other implementations described herein.

As used herein, "logic" is an alternative or additional processing resource to perform a particular action and/or function, etc., described herein, which includes hardware, e.g., various forms of transistor logic, application specific integrated circuits (ASICs), etc., as opposed to machine executable instructions, e.g., software firmware, etc., stored in memory and executable by a processor. Further, as used herein, "a" or "a number of" something can refer to one or more such things. For example, "a number of widgets" can refer to one or more widgets. Also, as used herein, "a plurality of" something can refer to more than one of such things.

What is claimed is:

1. A method comprising:
   performing a channel sounding operation to estimate dynamic channel characteristics between an Access Point (AP) and a wireless device;
   determining, based on the estimated dynamic channel characteristics, whether a first transmit configuration without polarization diversity at a maximum allowable transmit power level for non-orthogonal polarity will provide a better Quality of Experience (QoE) than a second transmit configuration with polarization diversity above the maximum allowable transmit power level for non-orthogonal polarity; and
   transmitting a transmit stream with the second transmit configuration when it is determined that it will provide a better QoE than the first transmit configuration,
   wherein the maximum allowable transmit power level for non-orthogonal polarity is based on a vector summation of individual powers of transmit streams in any point in space and the maximum allowable transmit level for orthogonal polarity is based on a vector sum of individual powers of transmit streams in any point in space.

2. The method of claim 1, wherein the determination of better QoE is based on throughput between the AP and wireless device.

3. The method of claim 1, wherein the determination of better QoE is based on signal strength received at the AP or at the wireless device.

4. The method of claim 1, wherein the determination of better QoE is based on a polarity configuration of antennas of the wireless device.

5. The method of claim 1, further comprising:
   determining the second transmit configuration such that polarization diversity is achieved using a first set of antennas of the AP in a first polarization orientation and a second set of antennas of the AP in a second polarization orientation.

6. The method of claim 5, wherein the first polarization orientation is horizontal and the second polarization is vertical.

7. The method of claim 5, wherein the first polarization orientation is horizontal and the second polarization orientation is at a slanted orientation.

8. The method of claim 1, wherein the channel sounding operation is performed periodically, and wherein a determination whether a transmit configuration without polarization diversity at a maximum allowable transmit power level for non-orthogonal polarity will provide a better QoE than a transmit configuration with polarization diversity above the maximum allowable transmit power level for non-orthogonal polarity is performed periodically.

9. A non-transitory machine readable storage medium having stored thereon machine readable instructions to cause a computer processor to:
   determine, based on estimated channel characteristics between an Access Point (AP) and a wireless device, whether a first transmit configuration without polarization diversity at a first transmit power level will provide a better link quality than a second transmit configuration with polarization diversity above the first transmit power level; and
   transmit a transmit stream with the second transmit configuration when it is determined that it will provide a better link quality than the first transmit configuration,
   wherein the first transmit configuration is based on a vector summation of individual powers of transmit streams in any point in space and the second transmit configuration is based on a vector sum of individual powers of transmit streams in any point in space.

10. The medium of claim 9, wherein the first transmit power level is the maximum allowable transmit power for a stream with non-orthogonal polarity.

11. A computing device comprising:
    a processing resource; and
    a memory resource storing machine readable instructions to cause the processing resource to:
       determine, based on estimated dynamic channel characteristics between an Access Point (AP) and a wireless device, whether a first transmit configuration at a first transmit power level without polarization diversity will provide a better Quality of Experience (QoE) than a second transmit configuration at a second transmit power level with polarization diversity; and instruct an antenna array of the AP to transmit a stream using the second transmit configuration when it is determined that it will provide a better QoE than the first transmit configuration, wherein the first transmit power level is based on a vector summation of individual powers of transmit streams in any point in space and the second transmit power level for orthogonal polarity is based on a vector sum of individual powers of transmit streams in any point in space.

12. The computing device of claim 11, where the computing device is the AP.

13. The computing device of claim 11, wherein the computing device is a wireless controller device that is separate from the AP.

* * * * *